US009850843B2

(12) United States Patent
Dokras et al.

(10) Patent No.: US 9,850,843 B2
(45) Date of Patent: Dec. 26, 2017

(54) USER INTERFACE WITH STOP-START BENEFIT METRIC

(71) Applicant: Ford Global Technologies, LLC, Dearborn, MI (US)

(72) Inventors: Nupur Dokras, Cambridge, MA (US); Marirose Ilkka, Royal Oak, MI (US); Kirk Pebley, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 324 days.

(21) Appl. No.: 14/745,935

(22) Filed: Jun. 22, 2015

(65) Prior Publication Data

US 2016/0369733 A1 Dec. 22, 2016

(51) Int. Cl.
| F02N 11/08 | (2006.01) |
| F02D 41/28 | (2006.01) |
| F02D 41/04 | (2006.01) |
| F02D 41/06 | (2006.01) |

(52) U.S. Cl.
CPC ........... F02D 41/28 (2013.01); F02D 41/042 (2013.01); F02D 41/065 (2013.01)

(58) Field of Classification Search
CPC ...... F02D 41/28; F02D 41/065; F02D 41/042; F02N 11/0803; F02N 11/0814; F02N 11/0818; F02N 11/0822; F02N 11/0844
USPC ............ 123/179.3, 179.4; 701/110, 112, 113
See application file for complete search history.

(56) References Cited

U.S. PATENT DOCUMENTS

| 9,074,571 | B1 * | 7/2015 | Malone ............... F02N 11/0822 |
| 9,347,388 | B2 * | 5/2016 | Bohn .................. F02N 11/0814 |
| 9,366,216 | B2 * | 6/2016 | Be ....................... B60W 50/085 |
| 9,388,750 | B2 * | 7/2016 | Be ........................... F02D 29/02 |
| 2011/0210838 | A1 | 9/2011 | Fujiki et al. |
| 2011/0241864 | A1 | 10/2011 | Fujiki et al. |
| 2014/0081561 | A1 | 3/2014 | Be et al. |
| 2014/0167944 | A1 | 6/2014 | Yamaguchi |
| 2014/0278019 | A1 | 9/2014 | Be et al. |

\* cited by examiner

*Primary Examiner* — Hai Huynh

(74) *Attorney, Agent, or Firm* — David Kelley; Brooks Kushman P.C.

(57) ABSTRACT

A vehicle according to the present disclosure includes an engine configured to autostop and autostart during a drive cycle. The vehicle additionally includes a user interface and a controller. The controller is configured to present on the user interface a metric indicative of a quantity of engine autostops during a drive cycle.

19 Claims, 3 Drawing Sheets

USER INTERFACE WITH STOP-START BENEFIT METRIC

TECHNICAL FIELD

The present application relates to a user interface for communicating information pertaining to the status of an automatic start-stop system in an equipped vehicle.

BACKGROUND

Modern vehicle architectures allow for modes of operation designed to reduce energy consumption. These energy saving modes are often unable to be activated or used to their full potential due to usage of user-selectable features. Such features are often biased towards continuous operation or their own optimal performance, the consequence of which may result in the disabling of an energy conserving mode of vehicle operation. As a result, the fuel economy benefits of an energy conserving mode may be sacrificed despite an operator willingness to give up performance of these inhibiting features in order to extend operation in an energy conserving mode. Additionally, enabling and disabling an energy conserving mode in modern vehicle architectures is complex such that the causal relationship between feature controls and the functioning of an energy conserving mode may be unknown to typical drivers.

Hybrid technologies may be grouped generally into "full hybrid" and "micro-hybrid technologies." Full hybrid technologies may contain a hybrid propulsion system that utilizes at least two different sources of torque for propelling the vehicle. As one non-limiting example, a hybrid propulsion system may combine a conventional propulsion system that includes an internal combustion engine and a stepped-ratio change automatic transmission with an electric propulsion system that includes one or more electric motors and a rechargeable energy storage device, such as a battery, that can power the electric motors or store energy to improve fuel economy over the conventional vehicle. A hybrid electric vehicle (HEV) typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor, independent of the internal combustion engine.

Micro-hybrid technologies may contain Integrated Starter Generator (ISG) or other machines that are not capable of propelling the vehicle but are capable of supporting a rapid start of the engine as well as on/off operation of the engine while the vehicle is stationary. Thus, using micro-hybrid technologies, motor vehicles can be designed to employ certain aspects of HEV technology to reduce fuel consumption, but without use of a hybrid drivetrain. In such vehicles, sometimes called micro-hybrids or stop-start vehicles, shutting down the engine during conditions where the engine operates at idle speed is used to reduce fuel consumption in a conventional powertrain that includes an internal combustion engine and a stepped-ratio change automatic transmission, but no electric machine for driving the wheels.

In conventional ISG based micro-hybrids, the ISG may be placed in series with the internal combustion engine and transmission system. The ISG takes the place of the traditional engine starter as well as the traditional alternator/generator that generates electric power for accessories and battery storage. The ISG may allow the engine to go from zero rpm to several hundred rpm in a fraction of a second, thus providing seamless start-stop capability to the driver in addition to increased fuel economy and reduced emissions.

SUMMARY

A vehicle according to the present disclosure includes an engine configured to autostop and autostart during a drive cycle, a user interface, and a controller. The controller is configured to present on the user interface a metric based on a running total of engine autostops for a drive cycle.

In at least one embodiment, the metric includes a counter corresponding to a number of times the engine has been autostopped during a current drive cycle.

In at least one embodiment, the metric includes an efficiency value corresponding to a ratio of a number of requested engine autostops during a current drive cycle to a number of available engine autostops during the current drive cycle. In such an embodiment, the number of available engine stops during the current drive cycle may be based on a number of vehicle stops during the current drive cycle, a number of respective stops during the drive cycle during which a driver-dependent autostop-inhibit condition is satisfied, and a number of respective stops during the drive cycle during which a driver-independent autostop-inhibit condition is satisfied.

In various embodiments, the controller is further configured to present the metric in response to a key-on event, in response to a key-off event, and/or in response to a user request.

A method of controlling a vehicle according to the present disclosure includes receiving a first input indicating vehicle speed falling below a calibratable threshold. The method additionally includes receiving a second input indicating a vehicle temperature parameter being in an allowable range for an engine autostop. The method further includes receiving a third input indicating an engine autostop request. The method also includes outputting an autostop efficiency metric based on the first, second, and third inputs.

In at least one embodiment, outputting an autostop efficiency metric includes displaying the autostop efficiency metric on a vehicle user interface.

In at least one embodiment, the efficiency metric includes a ratio of a number of engine autostop requests during a current drive cycle to a number of vehicle stops with the vehicle temperature parameter being in the allowable range during the current drive cycle.

In various embodiments, the outputting is in further response to a key-on event, in further response to a key-off event, or in further response to a user request.

A control system for a vehicle according to the present disclosure includes a controller and a user interface. The controller is configured to receive a first input indicative of an engine autostop function being activated. The user interface is in communication with the controller and is configured to display a metric based on a running total of first inputs received during a drive cycle.

Embodiments according to the present disclosure provide a number of advantages. For example, systems and methods according to the present disclosure may provide a driver increased information regarding the operation and benefits of an automatic stop-start system. This may increase customer satisfaction, and may also result in a driver modifying driving behavior to result in more fuel-efficient vehicle operation.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
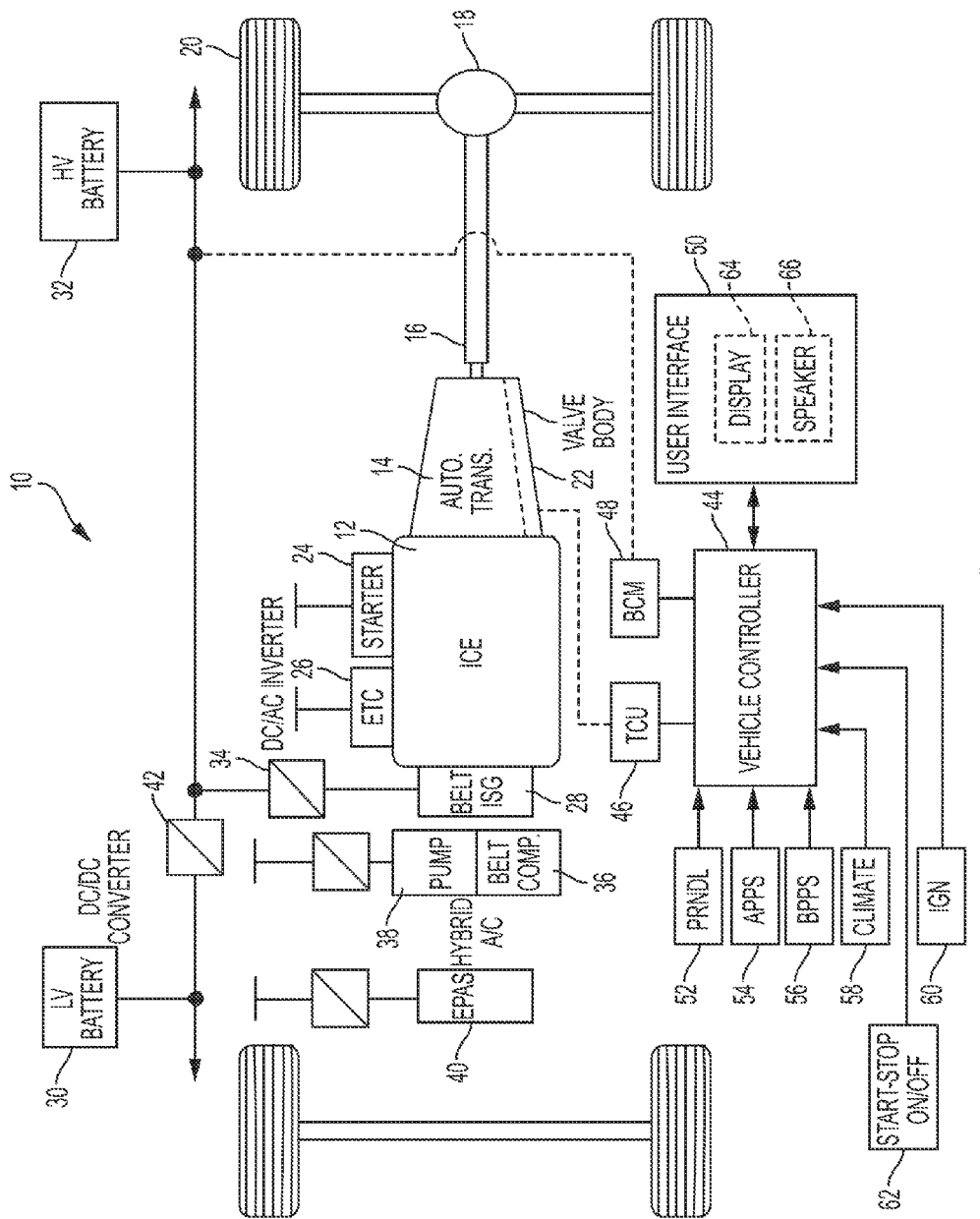
FIG. 1 is a schematic representation of a vehicle including a stop-start system and a user interface according to one embodiment of the present disclosure.

FIG. 1 schematically illustrates a vehicle 10 including an internal combustion engine 12 and an automatic transmission 14. Torque delivered from a crankshaft of the internal combustion engine 12 is delivered through multiple-ratio gearing of the transmission 14 to a driveshaft 16 and to a final drive differential-and-axle assembly 18 for traction wheels 20. The gearing for the transmission 14 may establish multiple torque ratios under the control of a valve body 22. The ratios may be established by engageable and disengageable clutches and brakes in a conventional fashion. The transmission 14 may be configured for a neutral state by disengaging a forward drive clutch. A starter motor 24 under the control of a low-voltage battery (not shown) can be used to start the engine 12 under cold start conditions. The vehicle 10 may also include an electronic throttle control 26 for the engine 12. While vehicle 10 is depicted with an automatic transmission, one or more embodiments of the present application may also be employed in vehicles having manual transmissions.

In addition, vehicle 10 may include an automatic start-stop system that automatically shuts down and restarts the engine 12 to reduce the amount of time the engine spends idling, thereby reducing fuel consumption and emissions. Automatically shutting down the engine may be advantageous for vehicles that spend significant amounts of time waiting at traffic lights or frequently come to a stop in traffic jams. While the automatic start-stop feature is present in HEVs, automatic start-stop systems may also appear in vehicles that lack a hybrid electric powertrain, such as vehicle 10.

The vehicle 10 may enter an auto-stop mode (i.e., the engine is auto-stopped) when certain vehicle propulsion conditions are met, such as when the driver has applied the brakes and the vehicle speed is below a predetermined speed threshold. Once the driver indicates a request for vehicle propulsion (e.g., by releasing the brake pedal), a powertrain controller may automatically restart the engine 12.

To this end, the engine 12 may be drivably connected to a crankshaft pulley, which drives a belt-driven integrated starter-generator 28 in one or more embodiments of the present application. Although a belt-drive is disclosed, other types of drives could be used to provide a driving connection between the engine 12 and the starter-generator 28. For example, a flexible chain drive or a geared drive could be used, depending on design choice. The starter-generator 28 may be electrically coupled to a voltage source, such as a low-voltage battery 30 or a high-voltage battery 32. The high-voltage battery 32 may be connected to the starter-generator 28 through a DC/AC inverter 34.

Since automobile accessories like air conditioners and water pumps have typically been designed to run off a serpentine belt on an engine, those systems need to be redesigned to function properly when the engine is turned off. In full HEVs, an electric motor is typically used to power these devices instead. In vehicle 10, hybrid vehicle accessories, such as an air conditioning compressor 36, a fuel pump 38 and a power steering pump 40, may be electrically powered by low-voltage battery 30. The voltage sources may be separated by a DC/DC converter 42, which may adjust, or "step down" the voltage level to allow the high-voltage battery 32 to charge the low-voltage battery 30.

A vehicle control system, shown generally as a vehicle controller 44, may be provided to control various components and subsystems of the vehicle 10, including the automatic start-stop system. The vehicle controller 44 may be a general vehicle controller, such as a vehicle system controller (VSC). Although it is shown as a single controller, the vehicle controller 44 may include multiple controllers or may include multiple software components or modules embedded in a single controller to control various vehicle systems, sub-systems and components. For instance, the vehicle controller 44 may include the powertrain controller to control various aspects of the micro-hybrid powertrain. The powertrain controller could be a separate hardware device, or may include a separate powertrain control module (PCM), which could be software embedded within a general purpose controller, such as the VSC. The vehicle controller 44 may generally include any number of microprocessors, ASICs, ICs, memory (e.g., FLASH, ROM, RAM, EPROM and/or EEPROM) and software code to co-act with one another to perform a series of operations.

The vehicle controller 44 may communicate with other controllers over a vehicle-wide network, such as a controller area network (CAN). The CAN may be a hardline vehicle connection (e.g., bus) and may be implemented using any number of communication protocols. For example, the vehicle controller 44 may communicate with a transmission control unit (TCU) 46 and a battery control module (BCM) 48, which is electrically coupled to the high-voltage battery 32. Alternatively, the aforementioned controllers may be software control modules contained within the vehicle controller 44 or other general purpose controllers residing on the vehicle. Some or all of these various controllers or software control modules can make up a control system in accordance with the present application. It will be appreciated, however, that various aspects of the disclosed subject matter are not limited to any particular type or configuration of the vehicle controller 44, or to any specific control logic for managing operation of the micro-hybrid powertrain or other vehicle systems.

The vehicle controller 44 may communicate with each individual vehicle system to monitor and control vehicle operation according to programmed algorithms and control logic. In this regard, the vehicle controller 44 may help manage the different energy sources available and the engine status in order to optimize fuel economy and/or maximize the vehicle's range. The vehicle controller 44 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas, or manual inputs, such as those described above. The vehicle controller 44 may process these input signals and others according to logic rules to monitor and control operation of the micro-hybrid powertrain.

In addition to the foregoing, the vehicle 10 may include a user interface 50 to facilitate communications with a driver. The user interface may communicate with the vehicle controller 44 and may provide relevant vehicle content to the driver. The vehicle controller 44 may be configured to receive input signals that are indicative of current operating and/or environmental conditions of the vehicle 10, including signals relevant to the operation of the automatic start-stop system. For instance, the vehicle controller 44 may receive input signals from the TCU 46 and the BCM 48, as well as a gear selector (PRNDL) 52, an accelerator pedal position sensor (APPS) 54, a brake pedal position sensor (BPPS) 56, a climate control module 58, an ignition switch (IGN) 60, and an automatic start-stop switch 62, or the like. The automatic start-stop switch 62 can allow the driver to manually deactivate the automatic start-stop system, thereby preventing engine auto-stops at the driver's request. The vehicle controller 44 may provide output to the user interface 50 such that the user interface 50 conveys vehicle operating information, such as information relating to the operation of the automatic start-stop system, to the driver. As will be described below, the user interface 50 may communicate relevant vehicle information to a driver visually through a display 64 and/or audibly via a speaker 66.

The display 64 may be electrically connected to a display controller (not shown). The display controller may communicate with the powertrain controller, the TCU 46, the BCM 48, and other dedicated or general purpose controllers, such as the vehicle controller 44. The display controller may gather data from various vehicle systems and components, which may be accessed via the CAN. Moreover, the display controller may provide data to the display 64 for conveying vehicle operation information to the driver in a meaningful manner. Signals output from the various vehicle systems and components may be processed, and display computations may be carried out, in the vehicle controller 44, the display controller or the display 64, or some combination thereof. The display controller may be a separate controller or may be integrated with the vehicle controller 44 or another general or dedicated vehicle controller. Thus, as with the powertrain controller, all monitoring, processing and control operations that may be performed by a separate display controller may be described herein as being carried out by the vehicle controller 44.

In addition to the automatic start-stop switch 62, the vehicle controller 44 may automatically prevent engine auto-stops during certain operating conditions. These operating conditions may be categorized into driver-independent autostop-inhibit conditions and driver-dependent autostop-inhibit conditions.

Driver-independent autostop-inhibit conditions refer to those over which a vehicle operator has no direct control. Driver-independent autostop-inhibit conditions include, but are not limited to, ambient temperature being outside of a calibratable range, engine temperature being outside of an allowable range, transmission fluid temperature being outside of an allowable range, and a battery temperature being outside of an allowable range. If any or all of these conditions are satisfied, engine autostops may be automatically prevented by the vehicle controller 44.

Driver-dependent autostop-inhibit conditions refer to those over which a driver may exert direct control. Driver-dependent autostop-inhibit conditions include, but are not limited to, vehicle climate control being active, accessory electric current draw exceeding an allowable threshold, a steering wheel turning angle exceeding an allowable threshold, and a brake pedal pressure being below an allowable threshold. If any or all of these driver-dependent conditions are satisfied, engine autostops may be automatically prevented by the vehicle controller 44.

In addition to the configuration shown in FIG. 1, embodiments according the present disclosure may be implemented in other stop-start configurations. As an example, some embodiments utilize an enhanced starter to autostart the engine, rather than the integrated starter-generator 28. Additional embodiments include other configurations for autostopping and autostarting the engine 12.

It may be desirable to provide a vehicle operator information regarding the operation of the stop-start system. While existing systems may activate a dashboard light or similar indicator when the engine has been autostopped, such systems may not provide adequate information for a driver to understand how the stop-start system works or what benefit it provides.

Figure 2:
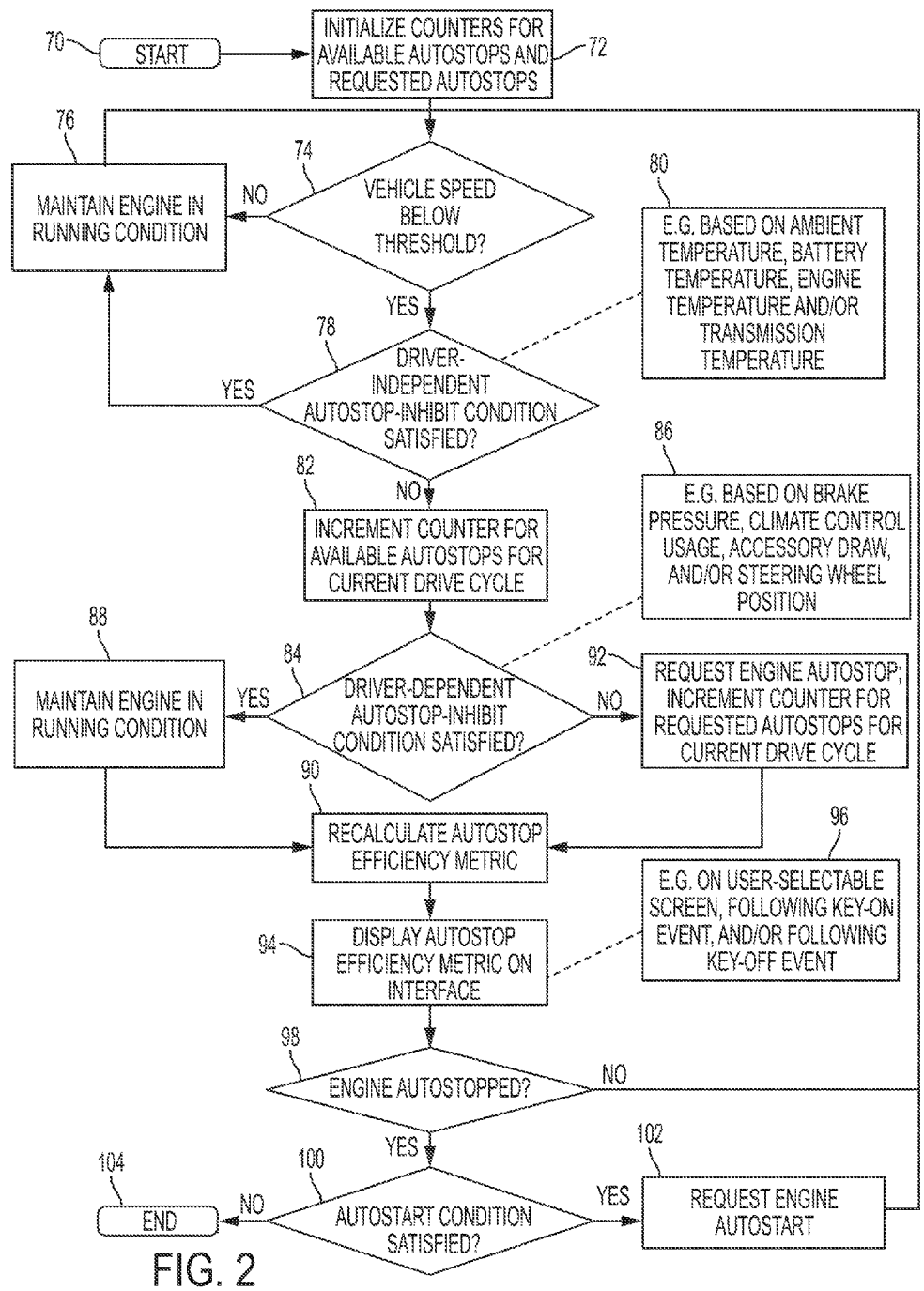
FIG. 2 is a flow diagram illustrating a method for presenting information via a user interface according to one embodiment of the present disclosure.

Referring now to FIG. 2, a flowchart illustrates a method according to one or more embodiments of the present application. The algorithm starts at block 70, e.g. in response to a key-on event, and control proceeds to block 72. At block 72, a counter for available autostops and a counter for requested autostops is initialized, e.g. reset to 0. These counters will be discussed in further detail below. Control then proceeds to operation 74.

At operation 74, a determination is made of whether vehicle speed is below a calibratable threshold. If the determination is negative, control proceeds to block 76. At block 76, the engine is maintained in a running condition. Control then returns to operation 74. Thus, until the entry condition of low vehicle speed is satisfied, the engine is maintained in a running condition.

Returning to operation 74, if the determination is positive, control proceeds to operation 78. At operation 78, a determination is made of whether a driver-independent autostop-inhibit condition is satisfied. As illustrated at block 80, this determination may be based on factors including, but not limited to, ambient temperature, battery temperature, engine temperature, and transmission temperature. If the determination is positive, i.e. a condition over which a vehicle operator has no direct control is preventing an autostop, control returns to block 76. At block 76, the engine is maintained in a running condition. Control then returns to operation 74. Thus, when an autostop-inhibit condition is present over which a driver has no control, the engine is maintained in a running condition.

Returning to operation 78, if the determination is negative, control proceeds to block 82. At block 82, an available-autostop counter is incremented. The available-autostop counter indicates a number of available autostop events during the current drive cycle. Available autostop events refer to events during which vehicle speed is sufficiently low to initiate an autostop, and where no driver-independent autostop-inhibit conditions are satisfied. Control then proceeds to operation 84.

At operation 84, a determination is made of whether a driver-dependent autostop-inhibit condition is satisfied. As illustrated at block 86, this determination may be based on factors including, but not limited to, applied brake pressure, vehicle climate control usage, accessory draw, and steering wheel position. If the determination is positive, i.e. a condition over which a vehicle operator has control is preventing an autostop, control proceeds to block 88. At block 88, the engine is maintained in a running condition. Control then proceeds to block 90, which will be discussed in further detail below.

Returning to operation 84, if the determination is negative, i.e. no conditions over which a vehicle operator has control are preventing an autostop, control proceeds to block 92. At block 92, an engine autostop is requested. In addition, a requested-autostop counter is incremented. The requested-autostop counter indicates a number of requested autostops during the current drive cycle. Control then proceeds to block 90.

At block 90, an autostop efficiency metric is recalculated. The autostop efficiency metric may be based on the available-autostop counter and/or the requested-autostop counter. In one embodiment, the autostop efficiency metric includes a ratio or percentage of requested autostop events to available autostop events during the current drive cycle. In such an embodiment, the autostop efficiency metric may be calculated by dividing the requested-autostop counter by the available-autostop counter. In another embodiment, the autostop efficiency metric includes the number of requested autostop events during the current drive cycle. In such an embodiment, the autostop efficiency metric is equal to the requested-autostop counter. Other appropriate metrics or a combination of metrics may, of course, be used. Control then proceeds to block 94.

At block 94, the autostop efficiency metric is displayed on the user interface 50. This will be discussed in further detail below with respect to FIGS. 3a-3c. The metric may be displayed in response to various inputs. As illustrated at block 96, the metric may be displayed on a user-selectable screen of the user interface 50, or may be displayed following a subsequent key-off event or subsequent key-on event. Control then proceeds to operation 98.

At operation 98, a determination is made of whether the engine is autostopped. If the determination is negative, e.g. because the determination of operation 84 was positive, then control returns to operation 74. If the determination is positive, e.g. because the determination of operation 84 was negative, control proceeds to operation 100.

At operation 100, a determination is made of whether an autostart condition is satisfied. If the determination is positive, e.g. because a driver has released a brake pedal, turned a steering wheel, or other appropriate conditions exist, then control proceeds to block 102. At block 102, an engine autostart is requested. Control then returns to operation 74. Returning to operation 100, if the determination is negative, the algorithm ends at block 104.

Variations on the above are, of course, possible. For example, the autostop efficiency metric may be calculated across multiple drive cycles in addition to a single drive cycle.

Figure 3A:
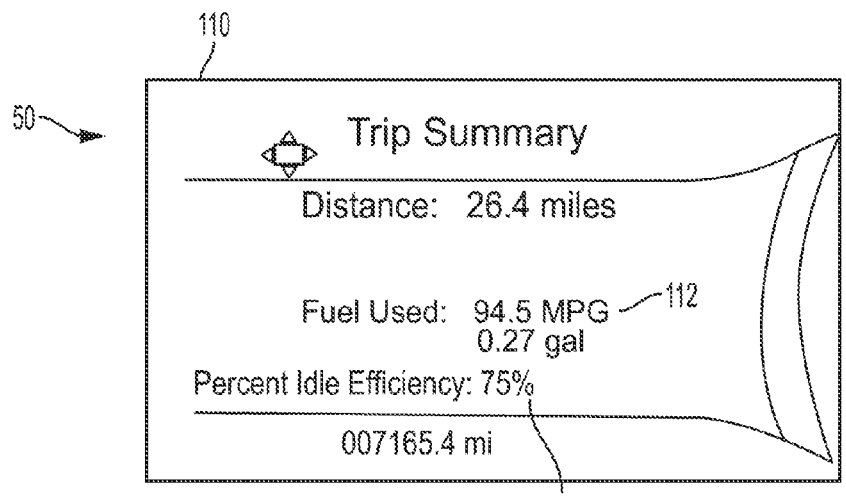
FIGS. 3a-3c depict exemplary views of a user interface display according to embodiments of the present disclosure.
Figure 3B:
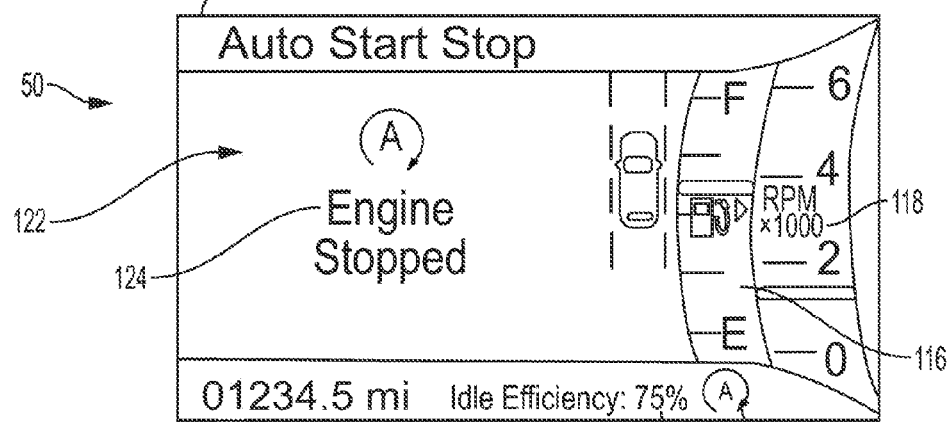
Figure 3C:
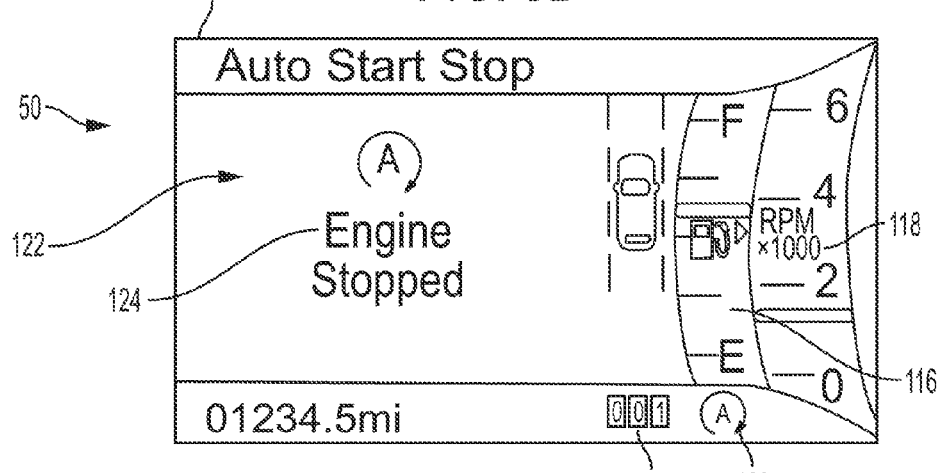

Referring generally to FIGS. 3a-c, the user interface 50 is shown in greater detail in accordance with one or more embodiments of the present application. As seen therein, the user interface 50 may include at least one display 110 and associated circuitry, including hardware and/or software, necessary to communicate with the vehicle controller 44 and operate the display 110. The display 110 may convey a host of information about the vehicle and its surroundings using graphical, schematic, numerical, textual and/or iconic representations or images. The display 110 may be generally used to convey relevant vehicle content to a driver of the vehicle 10 including, for example, information relating to the operation of the vehicle 10 and/or the status of the automatic stop-start system.

The display 110 may be disposed within a dashboard (not shown) of the vehicle 10, such as in an instrument panel or center console area. Moreover, the display 110 may be part of another user interface system, such as a navigation system, or may be part of a dedicated information display system or message center. The display 110 may be a liquid crystal display (LCD), a plasma display, an organic light emitting display (OLED), or any other suitable display. The display 110 may include a touch screen for receiving driver input associated with selected areas of the display 110. The user interface or display may also include one or more buttons (not shown), such as hard keys or soft keys, for receiving driver input. Other operator inputs known to one of ordinary skill in the art may also be employed without departing from the scope of the present application.

One or more embodiments of the present application may be implemented using the user interface 50. The vehicle controller 44 may regularly receive vehicle data, including operational and environmental data, from communicatively connected devices, such as those described above. Moreover, the data may be processed into one or more representations that may be displayed on the display 64, including information that may encourage efficient driving behavior or other economical vehicle operating choices.

Referring to FIG. 2a, the display 110 presents an exemplary trip summary screen. A trip summary screen may be presented in response to a key-on event, key-off event, or other appropriate signals. The trip summary screen includes efficiency data 112 pertaining to a most recent drive cycle. The efficiency data 112 may include fuel consumption, fuel economy, distance travelled, and/or other parameters. In addition, an autostop efficiency metric 114 is presented. In this embodiment, the autostop efficiency metric 114 corresponds to a percentage of requested autostop events relative to available autostop events during the most recent drive cycle.

Referring to FIG. 2b, the display 110 presents an exemplary user-selectable information screen. The user-selectable information screen may be activated by a driver in response to at least one driver input to the user interface 50 or other appropriate inputs. Various indicators are provided. Exemplary indicators include a fuel gauge 116 and a tachometer 118. In addition, a stop-start indicator 120 may be provided. The automatic stop-start indicator 120 may be configured to indicate an active or inactive state of the automatic stop-start system. In addition, a message region 122 may be provided for displaying messages 124 concerning the stop-start system or other appropriate messages. In addition, an autostop efficiency metric 114 is presented. In this embodiment, the autostop efficiency metric 114 corresponds to a percentage of requested autostop events relative to available autostop events during the current drive cycle.

Referring to FIG. 2c, the display 110 presents another exemplary user-selectable information screen. The user-selectable information screen is generally similar to that of FIG. 2b. In this embodiment, an autostop efficiency metric 114' is presented. In this embodiment, the autostop efficiency metric 114' corresponds to a number of requested autostop events during the current drive cycle.

As may be seen from the various embodiments, the present invention provides a vehicle operator with increased information regarding the operation and benefits of an automatic stop-start system. This may increase customer satisfaction, and may also result in the operator modifying his or her driving behavior to result in more fuel-efficient vehicle operation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine configured to autostop and autostart during a drive cycle;
   a user interface; and
   a controller configured to present on the user interface a metric based on a running total of engine autostops for a drive cycle.

2. The vehicle of claim 1, wherein the metric includes a counter corresponding to a number of times the engine has been autostopped during the drive cycle.

3. The vehicle of claim 1, wherein the metric includes an efficiency value corresponding to a ratio of a number of requested engine autostops during the drive cycle to a number of available engine autostops during the drive cycle.

4. The vehicle of claim 3, wherein the number of available engine stops during the drive cycle is based on a number of vehicle stops during the drive cycle, a number of respective stops during the drive cycle during which a driver-dependent autostop-inhibit condition is satisfied, and a number of respective stops during the drive cycle during which a driver-independent autostop-inhibit condition is satisfied.

5. The vehicle of claim 1, wherein the metric indicates a quantity of engine autostops during a previous drive cycle, and the controller is further configured to present the metric in response to a key-on event.

6. The vehicle of claim 1, wherein the metric indicates a quantity of engine autostops during a current drive cycle, and the controller is further configured to present the metric in response to a key-off event.

7. The vehicle of claim 1, wherein the metric indicates a quantity of engine autostops during a current drive cycle, and the controller is further configured to present the metric in response to a user request.

8. A method of controlling a vehicle, comprising:
   receiving a first input indicating vehicle speed falling below a calibratable threshold;
   receiving a second input indicating a vehicle temperature parameter being in an allowable range for an engine autostop;
   receiving a third input indicating an engine autostop request; and
   outputting an autostop efficiency metric based on the first, second, and third inputs.

9. The method of claim 8, wherein outputting an autostop efficiency metric includes displaying the autostop efficiency metric on a vehicle user interface.

10. The method of claim 8, wherein the efficiency metric includes a ratio of a number of engine autostop requests during a current drive cycle to a number of vehicle stops with the vehicle temperature parameter being in the allowable range during the current drive cycle.

11. The method of claim 8, wherein the outputting is in further response to a key-on event.

12. The method of claim 8, wherein the outputting is in further response to a key-off event.

13. A control system for a vehicle, comprising:
    a controller configured to receive a first input indicative of an engine autostop function being activated; and
    a user interface in communication with the controller and configured to display a metric based on a running total of the first inputs received during a drive cycle.

14. The control system of claim 13, wherein the metric includes a counter indicative of a total number of times the engine autostop function is activated during the drive cycle.

15. The control system of claim 13, wherein the metric includes an efficiency value corresponding to a ratio of the first inputs received during a drive cycle to a number of available engine autostops during the drive cycle.

16. The control system of claim 15, wherein the controller is further configured to receive a second input indicative of vehicle speed falling below a threshold and a third input indicative of a driver-independent autostop-inhibit condition being satisfied, and wherein the number of available engine stops is based on the number of second inputs received during the drive cycle and the number of third inputs received during the drive cycle.

17. The control system of claim 13, wherein the user interface is further configured to display the metric in response to a key-on event.

18. The control system of claim 13, wherein the user interface is further configured to display the metric in response to a key-off event.

19. The control system of claim 13, wherein the user interface is further configured to display the metric in response to a user request.

* * * * *